United States Patent [19]

Hoffman

[11] 3,796,112

[45] Mar. 12, 1974

[54] STEERING WHEEL KIT

[75] Inventor: Edward H. Hoffman, Simi, Calif.

[73] Assignee: Royal Industries, Inc., Pasadena, Calif.

[22] Filed: July 13, 1972

[21] Appl. No.: 271,414

[52] U.S. Cl............................ 74/493, 74/495
[51] Int. Cl............................. B62d 1/18
[58] Field of Search........... 74/493, 552, 495; 64/21

[56] References Cited
UNITED STATES PATENTS
3,167,971   2/1965   Zeigler et al.................. 74/493
3,424,473   1/1969   Morgan........................ 74/493

*Primary Examiner*—Benjamin W. Wyche
*Assistant Examiner*—F. D. Shoemaker
*Attorney, Agent, or Firm*—Christie, Parker & Hale

[57] ABSTRACT

A steering wheel assembly kit for converting a motor vehicle having a non-tiltable steering wheel to a tiltable steering wheel. The kit includes a first housing member adapted to be secured to the steering shaft of the vehicle and carries a steering shaft adapter and one of the elements of a universal coupler for rotation therewith. A second housing member rotatably mounts the second element of the universal coupler to provide a direct drive to the steering shaft. The second housing member is adapted to be pivotably connected to the first housing member to allow it to be positioned in axial alignment with the steering shaft and to be moved into a tilted position relative thereto whereby the steering shaft is controlled at all positions to the universal coupling elements.

8 Claims, 8 Drawing Figures

FIG. 2
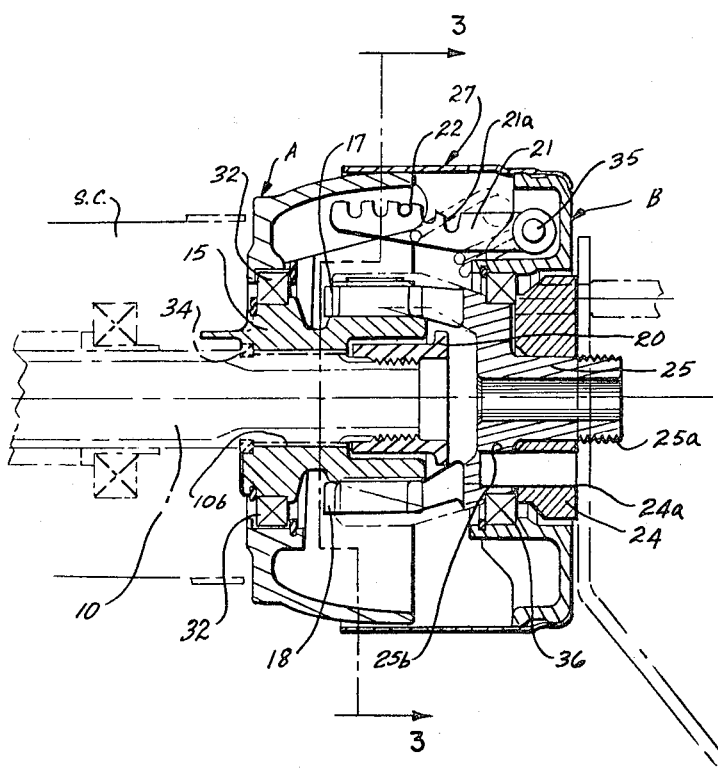
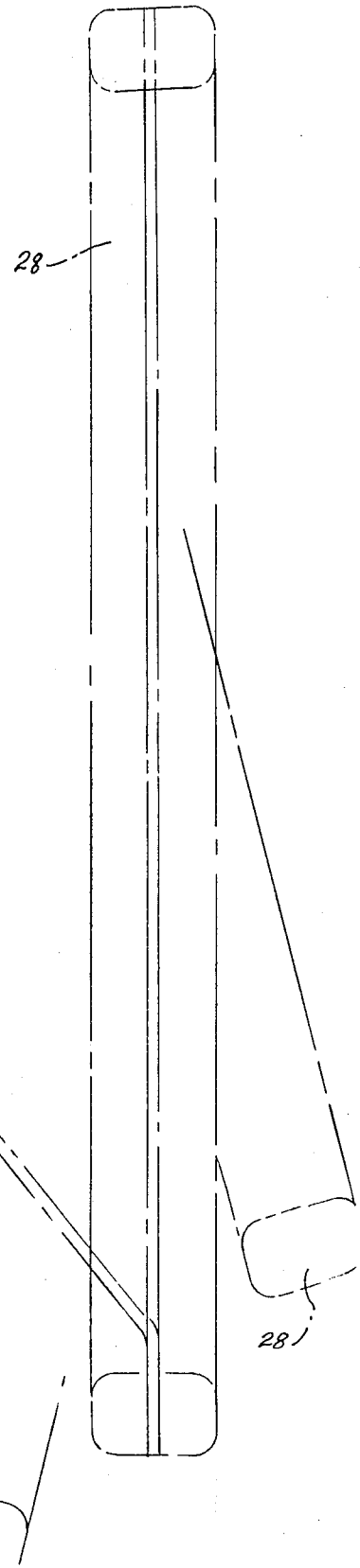

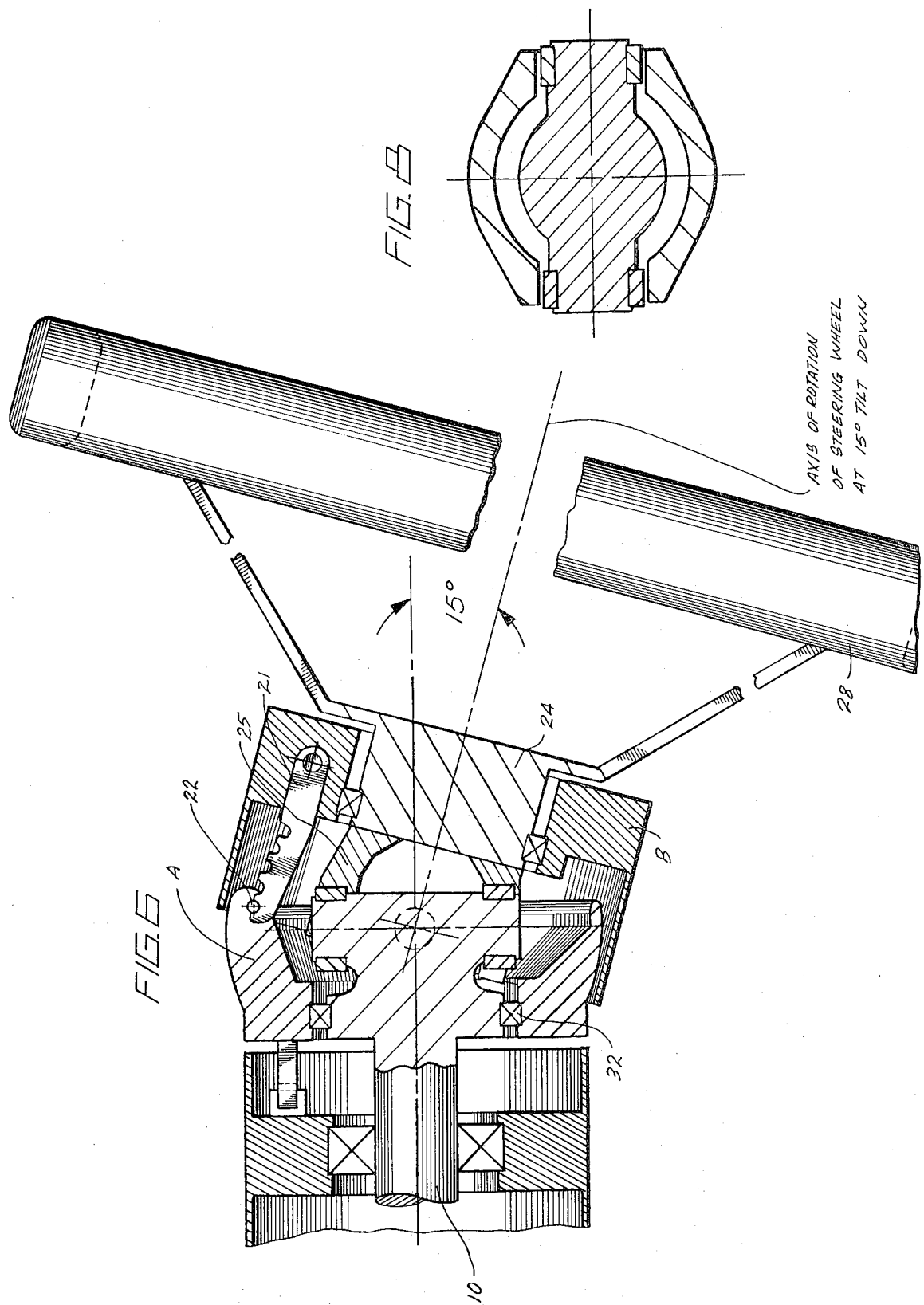

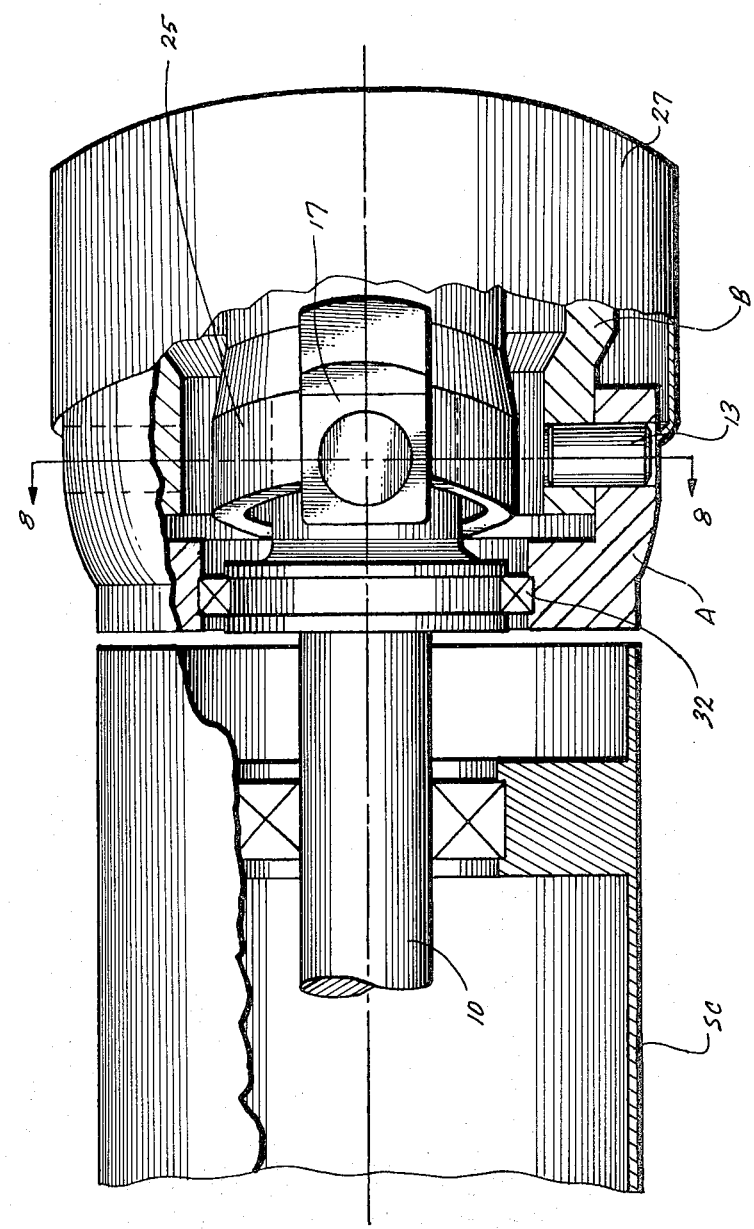

STEERING WHEEL KIT

The kit includes a first housing member adapted to be secured to the steering shaft of the vehicle and carries a steering shaft adapter and one of the elements of a universal coupler for rotation therewith. A second housing member rotatably mounts the second element of the universal coupler to provide a direct drive to the steering shaft. The second housing member is adapted to be pivotably connected to the first housing member to allow it to be positioned in axial alignment with the steering shaft and to be moved into a tilted position relative thereto whereby the steering shaft is controlled at all positions to the universal coupling elements.

DISCLOSURE OF INVENTION

This invention relates to a steering wheel kit and more particularly to an assembly kit for converting a motor vehicle having a non-tiltable steering wheel to a tiltable steering wheel.

At the present time, motor vehicles are being manufactured with steering wheels that are tiltable. The tiltable steering wheels are equipped by the motor vehicle manufacturer with such equipment. A tiltable steering wheel allows the motor vehicle operator to position the steering wheel in a multiplicity of positions in accordance with the operator's desires. Such tiltable steering wheels are adapted to assume a normal position in axial alignment with the steering shaft of a motor vehicle and assume a plurality of tilted positions with respect to the axis of the steering wheel shaft. It has been found acceptable by motor vehicle operators to utilize a tiltable steering wheel since it allows the operator to enter and exit from the motor vehicle more readily and allows him to place the steering wheel in a position that he finds most comfortable to his driving habits or to change the position of the steering wheel while driving. At the present time there is no means available for converting the standard non-tiltable steering wheel to a tiltable wheel for vehicles that have not been equipped with tiltable steeling wheels by the motor vehicle manufactures. The overwhelming majority of the motor vehicles have not been manufactured with tiltable steering wheels. There is a need at the present time for an assembly kit to convert a steering wheel from a non-tilting type to a tilting type at a minimum cost. To this end, such a conversion kit should be of such a simple construction that it allows the motor vehicle owner possessed with a minimum of mechanical skills to remove the non-tiltable steering wheel and replace it with a unit to convert it to a tiltable steering wheel.

The present invention provides an improved, inexpensive and simple assembly kit for converting a motor vehicle having a non-tiltable steering wheel to a tiltable steering wheel. The tiltable wheel assembly kit of the present invention comprises a minimum of parts that can be readily installed by an individual having a minimum of mechanical skills without any assembly problems or safety problems. In the course of converting the steering wheel to a tiltable type, the kit of the present invention has the additional feature that a custom type steering wheel may be readily substituted for the original steering wheel.

From a structural standpoint, the present invention comprehends a kit for converting a motor vehicle having a non-tiltable steering wheel to a tiltable steering wheel wherein the vehicle has a steering column arranged with a coaxial steering shaft. The kit comprises a first housing member adapted to be pressed against the end of the steering column and carrying means to be secured to the steering shaft. The steering shaft adapter means carries one of the elements of a universal coupling means and it is mounted with the steering shaft such that it will rotate therewith. The second housing member is adapted to be pivotably connected with the first housing member. The second housing member rotatably mounts the second element of the universal coupling so that when the two are coupled together a direct drive is provided to allow the steering shaft to be rotatably controlled including when in the tilted positions of the first and second housing. The present kit further includes means for selectively and releasably securing the second housing member in axial alignment with the steering shaft, non-tilted, and for permitting the second housing member to be moved into a plurality of tilted positions. The pivot axis of the first housing is arranged to be normal to and intersecting its shaft axis. Similarly, the pivot axis of the second housing is to be normal to and intersecting its shaft axis. In one practical embodiment of the invention, the first element of the universal coupler comprises a trunnioned shaft adapter mounted rotatably with the first housing such that its trunnion axis rotates in the plane of its housing pivot axis and the second element of the coupler comprises a slotted shaft adapter that engages the trunnions of the first adapter and is rotatably mounted to the second housing such that its slots are symmetrical with the intersection of the second housing pivot and shaft axes.

These and other features of the present invention may be more fully appreciated when considered in the light of the following specification and drawings, in which:

FIG. 2 is a cross sectional view of the assembled elements of a tiltable wheel conversion kit illustrating portions in dotted outline as it is mounted to a conventional steering column and shaft;

FIG. 6 is a simplified view of the unit of FIG. 2 illustrating the unit in a tilted relationship from that illustrated in FIG. 2;

FIG. 7 is a top plan view, with portions broken away, of the unit of FIG. 6;

FIG. 8 is a sectional view taken along the line 8—8 of FIG. 7.

Figure 1:
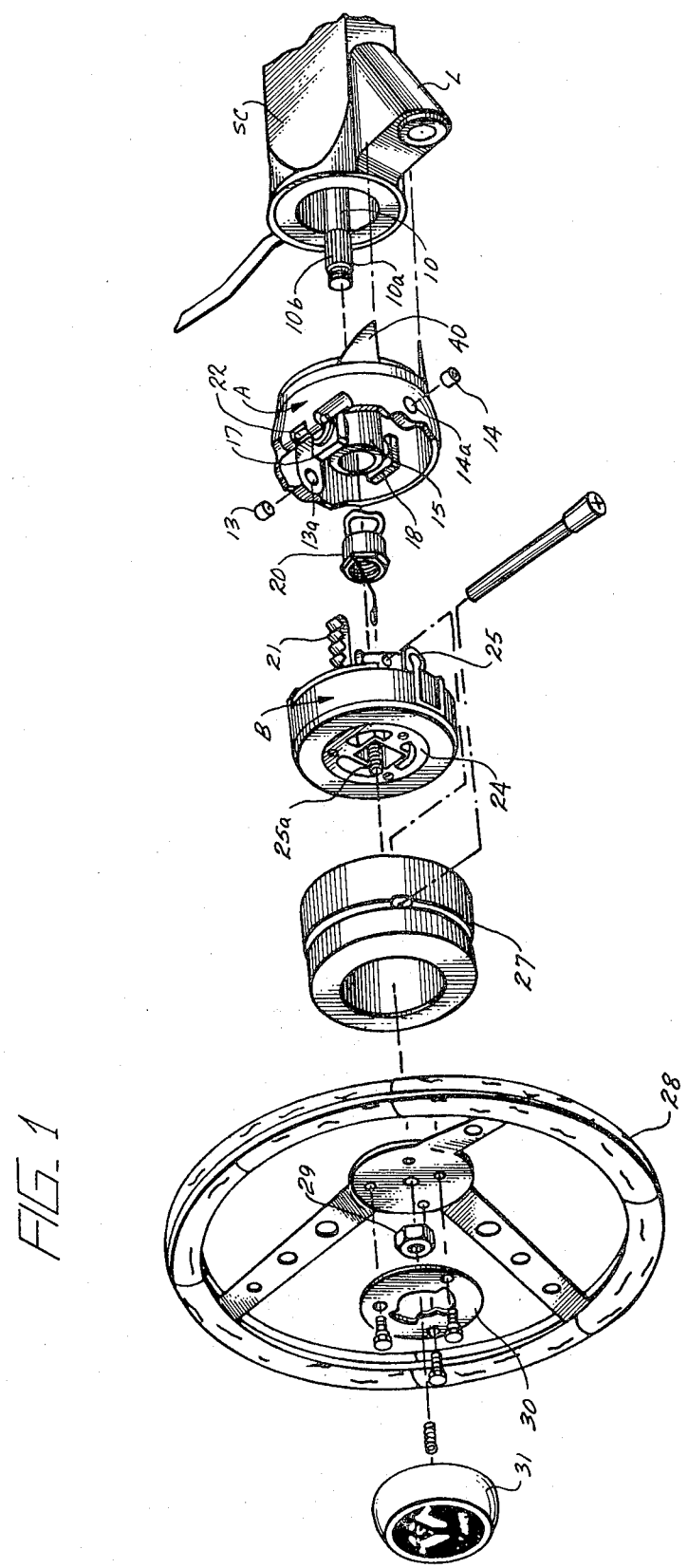
FIG. 1 is an exploded view of the elements of the tilt wheel conversion kit embodying the present invention.
Figure 3:
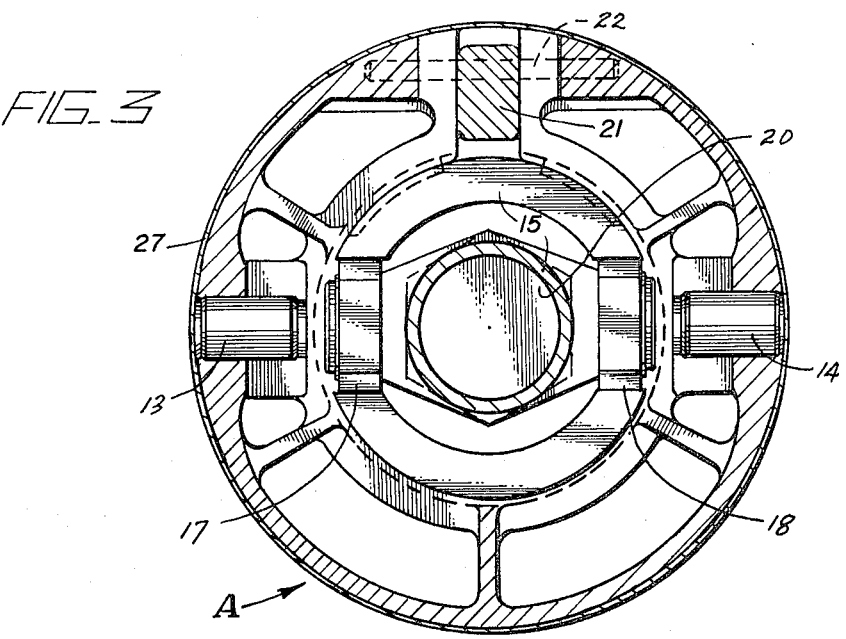
FIG. 3 is a sectional view taken along the line 3—3 through the housing pivot of the unit illustrated in FIG. 2.

Now referring to the drawings, the tiltable wheel conversion kit of the present invention will be examined in detail. The unit as illustrated is particularly adapted for converting a Volkswagen type motor vehicle from having a non-tiltable steering wheel to a tiltable unit. To this end, FIG. 1 illustrates a portion of a Volkswagen post ignition lock L attached to the steering column which is identified by the reference letters SC. The steering shaft 10 is arranged coaxially of the steering column of the vehicle as is conventional. It should be understood that, as illustrated, the factory equipped steering wheel has been removed from the steering shaft 10 and the illustration of FIG. 1 shows the relationship of the elements of the present invention as they are to be assembled on the steering shaft 10, progressing from right to left, the steering shaft having a splined and threaded end 10$^a$.

Basically, the tilt wheel kit of the present invention comprises a first housing member A and a second housing member B adapted to be pivotally connected to each other for rotatably controlling the steering shaft 10.

The assembly kit, then, comprises a first housing member A adapted to be pressed against the steering column SC and, as illustrated, is constructed and defined to be mounted so as to straddle the ignition lock structure L. The second major component of the assembly kit is a second housing member B constructed to be tiltably mounted to the first housing member A by means of the wrist pins 13 and 14 that are secured to suitable apertures 13$^a$ and 14$^a$ provided in the housing A. The first housing member A further mounts an adapter hub 15 to be fixed to the steering shaft 10. The adapter hub 15 carries one of the elements of the universal coupler illustrated as a trunnion stub pair supporting blocks 17 and 18 mounted on the adapter 15 at diametrically opposed locations. The adapter 15 is normally rendered fixed with the steering shaft 10 through the provision of suitable securing means such as the mating splines between the adapter 15 and the steering shaft 10$^b$. The adapter 15 is axially secured by illustrated nut 20 which is to be secured to the threaded end of the steering shaft 10 at the threaded end 10$^a$. The second housing member B mounts a pawl 21 that coacts to secure the two housing members A and B together by being secured to a latch pin 22 carried by the housing member A. The pawl 21 is resiliently mounted to allow it to be depressed to engage and to be latched to the pin 22 upon assembly.

The secured position of the pawl 21 with respect to the latch pin 22 is controlled by an operating lever 23 secured to the second housing member B for selectively and releasably controlling the position of the pawl 21 with respect to the latching pin 22 for effecting the desired position of the housing B with respect to housing A. The second housing member B includes a wheel mounting element 24 adapted for enclosing the outer open end of the housing B and rotatably receiving the end 25$^a$ of slotted drive joint half 25. The drive joint half 25 is the second member of the universal coupler and coacts with the trunnion mounted bearing blocks 17 and 18 for providing the desired coupling between a steering wheel and the steering shaft 10. The assembled housing members A and B are preferably enclosed by means of a cover member 27 which slips over the housing members A and B when the unit is completely assembled. A steering wheel 28 is mounted on the outside of the cover member 27 by being fastened to the wheel mount 24. The steering wheel 28 may be of conventional design or preferably of a custom design. The steering wheel 28 is fixed to the wheel mount 24 and both the wheel mount 24 and the steering wheel 28 are axially restrained to the threaded end 25$^a$ of the slotted drive joint half 25 by means of a fastener 29. A horn ring plate 30 is mounted with the horn button 31 in a conventional relationship with the steering wheel 28.

The position of the elements of the conversion kit when assembled can be best appreciated from examining FIGS. 2-5. The first housing member A is illustrated in FIG. 2 as it is mounted to the steering shaft 10 via the adapter hub 15 illustrated as supporting the housing A by means of a bearing 32. The adapter hub 15 is fixed in rotation to the steering shaft 10 by means of mating splines 10$^b$. The adapter hub 15 is axially fixed to the steering shaft 10 by means of a retaining ring 34 and retaining nut 20. Housing A is prevented from rotating with the steering shaft 10 by a tangential engagement with the steering column. One such arrangement is illustrated in FIG. 1 by housing ears 40 engaging ignition lock L. The adapter hub 15 contains trunnion stubs which mount a pair of bearing blocks 17 and 18. The bearing blocks preferably may be constructed of a glass-filled nylon material for coacting and receiving the slot of the drive joint half 25. The first housing member A further mounts a latching element or a latch pin 22 for coacting with the pawl 21. The pawl 21 is pivotally mounted by means of a pivot pin 35 to the second housing member B. The pawl 21 is illustrated with a plurality of latching slots 21$^a$ for controlling the relative positions of the housing A and B between the non-tilted position illustrated in FIG. 2 and a plurality of tilted locations depending upon the particular slot 21$^a$ in which the pin 22 is positioned.

The pawl 21 is illustrated as having five latching positions 21$^a$. The slotted drive joint half 25 consists of a pair of slotted arms integral with a bearing plate and the steering wheel attach stud. The slots in joint half 25 may be made to accommodate cylindrical trunnion stubs directly or to accommodate the bearing blocks 17 and 18 as illustrated. In this fashion with the slotted drive joint half 25 arranged in a tilted relationship with respect to the longitudinal axis of the steering shaft 10, the slots of the joint half 25 slide back and forth on the cylindrical trunnion stubs on the bearing blocks 17 and 18. Note that the bearing blocks must also pivot on the trunnion stubs as the shaft assembly is rotated. Similarly, if the bearing blocks are omitted, the contact points between the slot surfaces and the cylindrical trunnion stub will oscillate pivotally about the trunnion stub axis as the shaft assembly is rotated. This construction defines a universal coupling which is considered as a constant velocity coupling to allow the steering shaft 10 to be rotated through the coupling when the slotted drive joint half 25 is arranged in any of the selected tilted relationships. For this purpose, the joint half 25 is supported in the second housing member B by means of bearing 36. The joint half 25 in turn supports the steering wheel mounting element 24 which provides a torque transferring means between the steering wheel and the joint half. The steering wheel mounting element 24 has the steering wheel 28 secured thereto to allow the rotational movement of the steering wheel 28 to be transmitted to the slotted joint half 25 and through the adapter 15 to the steering shaft 10.

Figure 4:
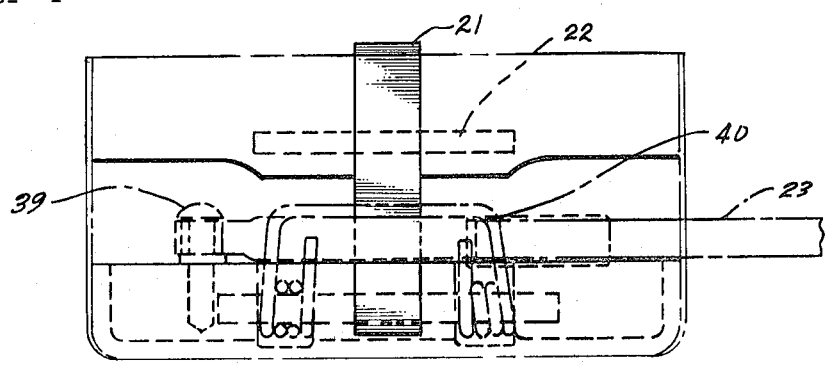
FIG. 4 is a top plan view of the detached, pivotable housing member of the assembly illustrated in FIG. 2.
Figure 5:
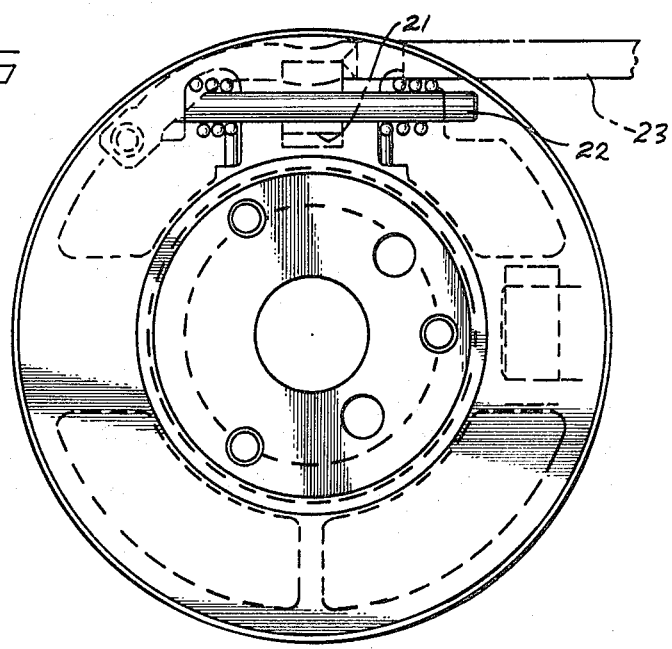
FIG. 5 is an end elevational view of the member of FIG. 4.

The relative positions of the housing member A AND B are determined by the provision of the operating arm 23 which is secured to the second housing member B by means of a fastener 39, as best illustrated in FIG. 4, with the latch spring 40 that allows the operating arm 23 to release the pawl 21 from the latch pin 22 by pulling down on the arm 23 with sufficient force to disengage the pawl 21 from the pin 22. This will allow the second housing member B to be pivoted about the wrist pins 13 and 14 to a desired position so that when this position is reached, the operating arm 23 may be released and allow the pawl 21 to be secured to the pin 22.

As is clearly evident from FIG. 1, the housing member A is defined with ears 40 so as to be slipped onto the steering column SC in a non-rotatable relationship therewith.

In a simplified form, from a structural standpoint, a tilted relationship of the steering wheel 28 is illustrated in FIGS. 6-8. In these views the steering wheel 28 is tilted at an angle of 15° from the longitudinal axis of the steering shaft 10. As is evident from viewing FIG. 6, when the wheel 28 is tilted, the housing member B is tilted with respect to the housing member A. In this relationship the pawl 21 engages the latch pin 22 at the outermost latching notch 22$^a$.

A feature that simplifies the installation of the tilt wheel assembly unit is the coaxial arrangement of the wrist pins 13 and 14 with the bearing blocks 17 and 18 as is evident from viewing FIG. 7.

It should now be evident that when the steering wheel 28 is in a tilted position, and is rotated to steer the motor vehicle, the slotted drive joint half 25 at the point it engages the bearing blocks travels linearly along the side edges of the bearing blocks while imparting rotary motion to the adapter 15 and thereby the steering shaft 10.

What is claimed is:

1. A kit for converting a motor vehicle having a non-tiltable steering wheel to a tiltable steering wheel, the vehicle having a steering column arranged with a coaxial steering shaft including
   a first housing member adapted to be secured to the steering wheel shaft column and carrying means adapted to be rotatably secured to the steering shaft, said means carrying one of the elements of a constant velocity universal coupling.
   a second housing member adapted to be pivotally coupled to the first housing member,
   pivot means coupling the first and second housing members together,
   the second housing member rotatably mounting a second element of the universal coupling and adapted to be coupled to said one element of the coupling to allow the steering shaft to be controlled thereby, and
   means for selectively and releasably securing the second housing member in axial alignment with the steering shaft and said first housing member and in a plurality of preselected tilted relationships therewith.

2. A kit as defined in claim 1 wherein said one of the elements of the coupling comprises a pair of diametrically spaced bearing blocks and the second element of the universal coupling comprises a slotted drive joint half whereby at any tilted position of the drive joint half, the drive joint slides back and forth over the bearing blocks.

3. A tilt wheel assembly kit for converting a motor vehicle having a non-tiltable steering wheel to a tiltable steering wheel, the vehicle having a steering column arranged with a coaxial steering shaft including
   a first housing member adapted to be mounted to the steering column in a non-rotatable relationship therewith,
   a steering shaft adapter carried by the first housing member so as to be coupled to the steering shaft to be rotatable therewith,
   means for securing the adapter to the steering shaft for relationship in unison with the steering shaft,
   U-joint bushing means mounted with said adapter,
   a second housing member adapted to be pivotally mounted to the first housing member, said second housing member rotatably carrying drive means adapted to be coupled to said bushing means for rotating the steering shaft upon rotation thereof including when the second housing member is tilted with respect to the longitudinal axis of the steering shaft,
   means coupled to said drive means for rotating same,
   means coupled between the first and second housing members for controlling the tilting and non-tilting relationship of the housing members and adapted to position the second housing member at a preselected plurality of tilted positions, and
   means coupled to the second housing member for controllably operating said latter mentioned means for controllably positioning the second housing member relative to the first housing member.

4. A tilt wheel assembly as defined in claim 3 wherein the first housing member carries a latch pin and the second housing member pivotally mounts a pawl engageable with the latch pin for releasably securing the housing members at said plurality of positions.

5. A tilt wheel assembly as defined in claim 4 wherein said means coupled to the drive means comprises a steering wheel mount secured to said drive means for rotation therewith, and a steering wheel secured to said wheel mount for rotating the steering shaft through said drive means at each of the selected positions of the second housing member.

6. A tilt wheel assembly as defined in claim 5 including a cover member mounted over said housing members.

7. A tilt wheel assembly as defined in claim 4 wherein the operating means comprises an operating handle extending outwardly of said second housing member and adapted to release the pawl from the latch pin for positioning the second housing member in another position and to secure the pawl and latch pin in said other position.

8. A tilt wheel conversion kit for converting a motor vehicle having a non-tilting steering wheel to a tiltable steering wheel comprising
   a base assembly member adapted to be non-rotatably mounted to the steering column of a motor vehicle and carrying a steering wheel adapter hub rotatably mounted thereto to receive the exposed end of a steering wheel shaft mounted in the steering column,
   the adapter hub mounting a pair of spaced apart bearing blocks,
   said base assembly member mounting a latching element,
   means for securing the adapter hub to the steering wheel shaft,
   a housing member adapted to be pivotally secured to said base assembly member,
   said housing member carrying a slotted drive member slidably coupled with the bearing blocks to rotatably drive the steering wheel shaft including when said housing member is tilted at preselected angles relative to the axis of the steering wheel shaft, said housing member pivotally mounting a housing member latching element adapted for coaction with the base assembly latching element for latching the housing member and the base assembly member together including when the housing member is positioned in one of said tilted positions, means extending outwardly of the housing member and coupled to the housing member to allow said latching elements to be selectively latched and unlatched to allow the housing member to be moved from an untilted position to various angles of tilt and from a tilted position to an untilted position to permit the steering wheel shaft to be rotated at any one of the latched positions, and a steering wheel adapted to be operatively secured to said housing member for rotatably driving said drive member.

* * * * *